United States Patent [19]

Boardman

[11] 4,424,591
[45] Jan. 3, 1984

[54] ANTENNA SWITCH FOR HOME VIDEO ACCESSORIES

[75] Inventor: Allen H. Boardman, Maryville, Tenn.

[73] Assignee: Magnavox Consumer Electronics Company, Knoxville, Tenn.

[21] Appl. No.: 324,746

[22] Filed: Nov. 25, 1981

[51] Int. Cl.³ .................. H04B 1/18; H04N 5/22; H01Q 1/50
[52] U.S. Cl. .................. 455/289; 455/292; 333/103; 343/858; 358/181; 358/188
[58] Field of Search ............ 455/82, 83, 140, 289, 455/292, 78; 333/101, 103; 343/858; 358/181, 188

[56] References Cited

U.S. PATENT DOCUMENTS 3,117,241 1/1964 Paynter et al. .................. 455/82
3,374,364 3/1968 Concelman .................. 333/103
4,078,214 3/1978 Beno .................. 333/103
4,097,899 6/1978 Yu .................. 358/181

Primary Examiner—Jin F. Ng
Attorney, Agent, or Firm—Pollock, Vande Sande & Priddy

[57] ABSTRACT

Apparatus is provided for coupling one of two signal sources to the antenna terminals of a television receiver. An antenna switch is provided which includes solid state switching elements which when receiving a biasing voltage connects one of two input ports to an output port for delivering a signal to a television receiver. In the unbiased state, the remaining input port is connected to the television receiver antenna terminals. High isolation is provided to prevent stray radiation from one signal source being received by a second signal source.

9 Claims, 3 Drawing Figures

ANTENNA SWITCH FOR HOME VIDEO ACCESSORIES

BACKGROUND OF INVENTION

The present disclosure relates to home video electronic devices. Specifically, a solid state antenna switch for connecting one of multiple radio frequency sources to a television receiver is provided.

Recently alternative programming for home television viewers has been provided with the introduction of video cassette recorders, video games, and video long playing disc (VLP) players. These alternative sources of programming for television receivers all provide a signal within the pass band of the television receiver which is introduced to the antenna terminals for viewing after signal processing the signals.

With the addition of these alternative program sources, the viewer receives local signals instead of the over-the-air broadcast signals communicated by a home television antenna. With the aforementioned alternative program sources, it is necessary to make frequent antenna connection changes to the television receiver depending upon the choice of program source. The inconvenience associated with changing over from an externally connected antenna to a local video signal source such as a VLP has resulted in the introduction of a switch mechanically operated at the antenna terminals of the television receiver. As a later development and refinement of the mechanically actuated antenna switch, antenna switches which sense the presence of a DC voltage output from a video accessory has been developed.

Antenna switches which are used in this application require a high isolation to be maintained between the outside television receiving antenna and the video accessory signal source. FCC rules specify a minimum isolation between ports of such antenna switches which imposes design constraints on the manufacturer of mechanically actuated switches.

The present invention represents an improvement over mechanical switches used to switch between signal sources for a television receiver and those antenna switches which utilize electromagnetic relays for switching between signal sources for a television receiver.

SUMMARY OF INVENTION

The object of the present invention is to provide for a solid state antenna switch which automatically connects the terminals of a video accessory to the antenna terminals of a television receiver.

The object of the present invention is accomplished by providing an antenna switch having three ports for externally connecting a television antenna, a video accessory, and a television receiver. When the video accessory is turned on to provide a signal to the television receiver, a bias voltage is applied to the antenna switch from the accessory for switching the television receiver antenna terminals into connection with the video accessory output terminals. When the video accessory is disabled, the externally connected television antenna is automatically connected to the television receiver antenna input terminals. When connected, the antenna switch of the invention provides for in excess of 60 db isolation between accessory and antenna input ports, thereby preventing any extraneous radiation by the accessory and antenna.

In one embodiment of the present invention, a center tapped transformer having a primary-to-secondary ratio of 2:1 is used to couple energy from an externally connected antenna to a television receiver input terminal. The input terminals to the television receiver are connected to the center tap of the transformer's primary winding. The secondary winding of the transformer is terminated with a diode and externally connected antenna. The center tap of the transformer is further connected through a diode to the video accessory input port. Radio frequency grounds are provided on one end of each of the primary and the secondary windings. The remaining end of the primary winding of the transformer is connected through a diode to ground.

In the aforesaid embodiment, when the video accessory is enabled, a bias voltage turns the diodes on, thereby shunting the secondary-to-ground, providing a signal path for any accessory signal which is coupled to the secondary winding. However, most of the signal provided by the video accessory is directly connected through a diode to the receiver antenna terminals, with the primary winding of the transformer providing cancellation of any signals in the primary because of the center-tap feed, thus further inhibiting the transfer of radio frequency signals to the antenna.

When the video accessory is turned OFF, the diodes become unbiased and signal energy from the antenna is coupled through the secondary of the transformer to the primary, with the center tap providing sufficient signal for the television receiver antenna terminals.

In still another embodiment of the invention, a one-to-one transformer is employed, with the secondary winding connected across the external antenna. The primary winding has one end connected to the television antenna terminals, and the remaining end connected through a gate to the video accessory output. Shunts are provided across the primary winding, and from the remaining end of the primary winding to a common terminal.

Thus, when the gate is enabled, and the shunt across the secondary winding is enabled, as well as the shunt terminating the primary winding, signals from the video accessory may be applied to the antenna terminals of the receiver. When the gate is disabled by removing a biasing current, and the remaining end of the primary winding is connected to ground, the antenna signal is coupled through the transformer to the receiver antenna terminals.

In both embodiments of the invention, sufficient isolation is provided so that video accessory signals do not reach the externally connected antenna in a level exceeding that permitted by Federal Communications Commission rules.

DESCRIPTION OF THE PREFERRED EMBODIMENTS

Figure 1:
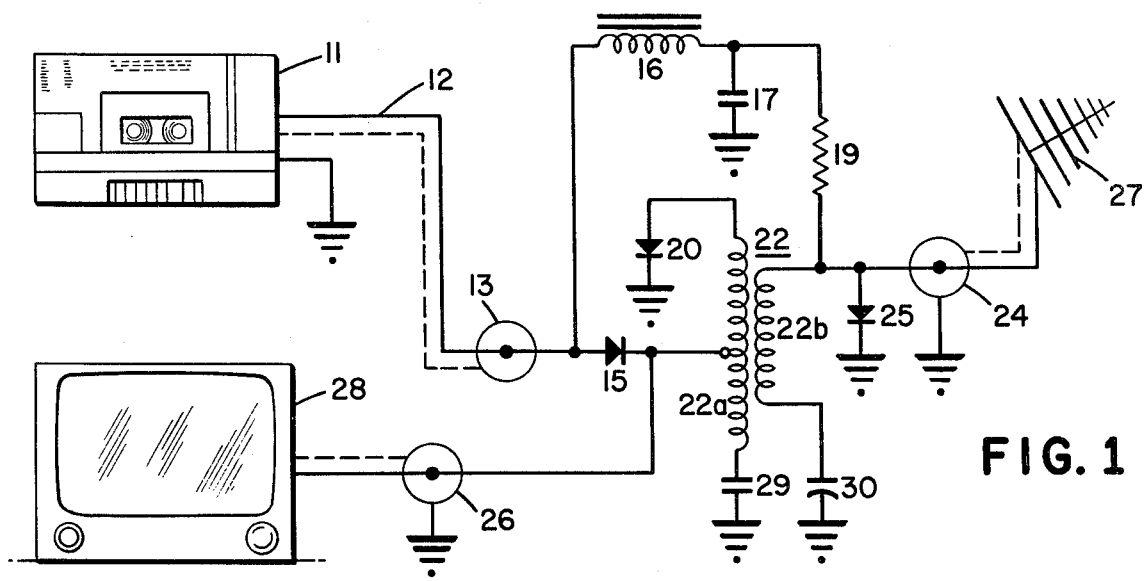
FIG. 1 is a schematic diagram of one embodiment of the invention connected to a video accessory, television antenna, and television receiver.

Referring now to FIG. 1, there is shown an antenna switch in accordance with the present invention. Three connectors, 13, 24, and 26 connect the antenna switch of FIG. 1 with a video accessory 11, television antenna 27, and television receiver 28. Video accessory 11 may be a video disc player, such as the type manufactured by The Magnavox Consumer Electronics Company, wherein an output signal is provided to cable 12 along with the DC biasing voltage, typically 12 v DC. A transformer 32 is provided in the antenna switch for coupling the television antenna 27 through connector 24 to television receiver 28 via connector 26. The transformer 22 has a primary winding 22A which includes a center tap connection. One side of the primary winding is connected through diode 20 to ground or common terminal, and the remaining side is connected through capacitor 29 also to ground. Secondary 22B is connected at one end to connector 24 for receiving a signal from antenna 27. The common connection of antenna 27 and connector 24 are shown at ground. Diode 25 connects the center connection of connector 24 to ground. Further, the remaining end of secondary 22B is connected through capacitor 30 to ground.

A diode 15 connects the signal center conductor of cable 12 through connector 13 to the center tap connection of primary winding 22A, and connects a signal from the video accessory 11 to the connector 26 for distribution to television receiver 28. A radio frequency choke 16 in connection with capacitor 17 form a biasing network for coupling a DC biasing voltage from cable 12 to diode 25 via current limiting resistor 19.

The operation of the antenna switch of FIG. 1 is as follows. When accessory 11 is turned ON, a radio frequency signal within the pass band of the television receiver 28 is supplied to connector 13. Further, a DC biasing voltage is supplied by cable 12 for rendering diodes 15, 20 and 25 conductive. With diodes 15 and 20 conductive, the signal from video accessory 11 is supplied equally to each half of the primary winding 22A. Further, the signal is supplied via diode 15 to connector 26 for injection to the television receiver 28. The primary winding 22A effectively causes a cancellation of the signal within the winding with very small amounts of the signal being induced in secondary 22B. This results because the flux set up within primary winding 22A, resulting from the center tap connection, causes a mutually opposite current to be induced in secondary 22B. Further, diode 25 which is also rendered conducting effectively shunts any residual signal appearing within secondary 22B prohibiting the signal from entering antenna 27. Those skilled in the art will recognize that capacitors 29 and 30 provide effective RF grounds to the respective ends of the connected windings 22A and 22B, while isolating any DC biasing current which may appear within either of the windings 22A or 22B.

Thus, it is clear that at the time video accessory 11 is turned ON, the diodes are effectively biased to force most of the signal from video accessory 11 to the connector 26 for application to television receiver 28 antenna terminals.

When video accessory 11 is disabled, both the radio frequency signal appearing on cable 12 and the DC bias voltage is removed. At this time, the diodes 15, 20, and 25 have no current applied thereto and are with respect to small radio frequency signals an open circuit. Transformer 22B will couple antenna signals appearing on antenna 27 to the primary winding 22A. Diode 15 will effectively isolate the signal appearing on the center tap of primary winding 22A thus permitting television receiver 28 to receive the antenna signal at a level which permits demodulation of the signal and introduction of both the sound and visual portions of the television signal.

Figure 2:
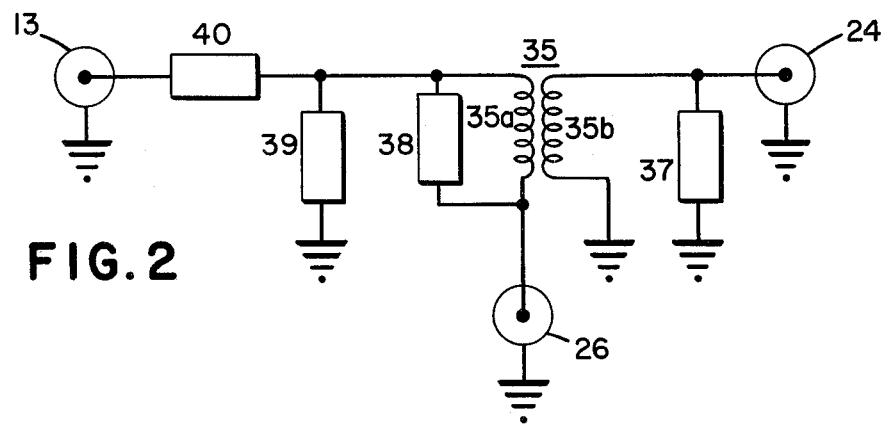
FIG. 2 is yet another embodiment of an antenna switch in accordance with the invention.
Figure 3:
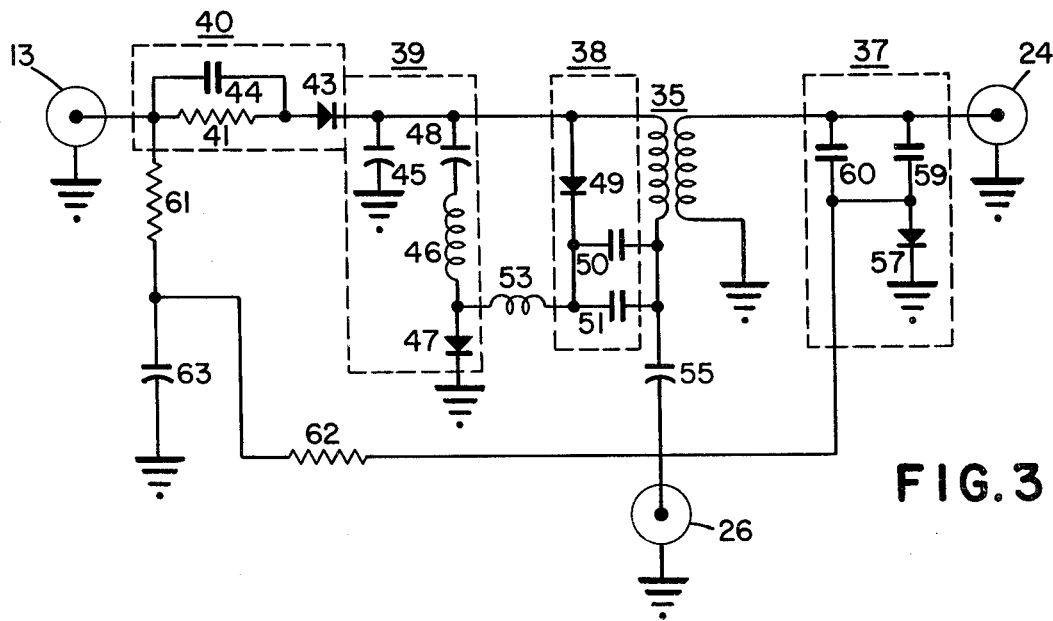
FIG. 3 is a schematic drawing of one means for implementing the embodiment of FIG. 2.

Further embodiments of the present invention are shown in FIGS. 2 and 3, which are superior in the degree of isolation they provide between input ports 13 and 24. Referring now to FIG. 2, there is shown a transformer 35 which does not include a center tap winding and has a 1:1 ratio. A shunt 37 is shown which is operable to effectively short the secondary winding of transformer 35. Further, a shunt 39 is shown which when operated, connects the top end of the primary winding 35A to a common ground connection. A gate 40 when operated connects a signal from connector 13 to the junction of shunt 39 and primary winding 35A. An additional gate 38 when operated connects the signal provided by gate 40 directly to the antenna connector 26.

The antenna switch of FIG. 2 operates as follows. When the accessory signal is to be applied to the antenna terminals of the television receiver, gates 40 and 38 are enabled. Further, shunt 37 is enabled. The signal from the video accessory is applied directly to the connector 26 for delivering the signal to television receiver 28. When the accessory 11 is disabled, and an antenna signal is to be supplied to the television receiver, gates 40, 38, and shunt 37 become open. Shunt 39 is closed to effectively ground the one end of winding 35A. In this condition, a signal from antenna 27 is passed through connector 24, secondary winding 35B, and appears across primary winding 35A. Connector 26 transmits the induced antenna signal to the television receiver 28.

Implementation of the circuit of FIG. 2 is shown more particularly in FIG. 3. Gate 40 comprises a diode 43 serially connected to a resistor 41, resistor 41 being in parallel with capacitor 44. The diode 43 is rendered conductive when the video accessory 11 applies a DC biasing voltage to connector 13 as described with respect to FIG. 1. Shunt 39 comprises a capacitor 45 resonant with the combination of inductor 46 and capacitor 48. Gate 38 comprises diode 49 connected from one end of the primary of transformer 35 of two capacitors 50 and 51 which are in turn connected to the remaining end of the primary winding. Two capacitors 50 and 52 are shown as it has been found that using two capacitors reduces the lead inductance with the capacitor, thus making the capacitor better RF conductors. Coupling capacitor 55 connects the remaining end of the primary of transformer 35 to connector 26. A radio frequency choke 53 connects diode 49 to diode 47 thus providing a DC biasing current path. When the video accessory is turned on, a biasing current flows through resistor 41, diode 43, diode 49, RF choke 53, and diode 47. Inductor 46 and capacitor 45 form a parallel resonant circuit, and diode 49 shunts the signal from video accessory 39 to DC voltage blocking capacitor 55. Additionally, diode 57 is enabled providing a radio frequency shunt through capacitors 59 and 60 across connector 24 and the secondary winding of transformer 35. Biasing of diode 57 is accomplished through resistors 61 and 62. A decoupling capacitor 63 provides further isolation between any signal appearing at the secondary of transformer 35 and the remaining portions of the antenna switch.

The operation of the antenna switch of FIG. 3 when video accessory 11 is disabled, is as follows. Diodes 43, 49 and 47 are effectively open-circuited. Under this condition, capacitor 45 is no longer in resonance with inductor 46 and capacitor 48. Capacitor 45 effectively connects one end of the primary winding of transformer 35 to ground. A signal appearing at connector 24 will be coupled from the secondary of transformer 35 to the primary of transformer 35. This coupled signal is applied through blocking capacitor 55 to connector 26. Diodes 47 and 49 remain open-circuited, and do not provide significant conduction of radio frequency signal. With the circuit of FIG. 3, isolation levels approaching 70 DB can be achieved for the frequency of interests, particularly in the VHF frequency spectrum.

Thus, there has been described with respect to two embodiments of the invention an antenna switch which is completely automatic, and which provides adequate isolation between input ports. Those skilled in the art will recognize other embodiments of the invention described more particularly by the claims which follow.

I claim:

1. An antenna switch for alternatively connecting two signal sources to an output port comprising:
    a first input port adapted to receive a first signal; an output port for delivering a signal to a receiver antenna input terminal;
    a transformer having first and second windings, said first winding connected between said input port and a common terminal for receiving said first signal, said second winding having first and second ends with the second end connected to said output port;
    a capacitor serially connected through a first diode across said first winding;
    a second input port adapted to receive a second signal, said second input port supplying a signal through second and third serially connected diodes to said output port, said first end of said second winding being connected to a junction point between the second and third diodes, said third diode being connected to the second end of said transformer second winding through a second capacitor;
    a third capacitor connected from the junction of said second and third diodes to said common terminal;
    an inductor having one end connected to the junction of said second and third diodes;
    a fourth diode connected to a remaining end of said inductor to said common terminal, said inductor and third capacitor forming a resonant circuit when said fourth diode conducts a current; and
    means biasing all of said diodes into and out of conduction whereby a signal at said second port is delivered to said output port when said diodes are conducting, and a signal at said first port is delivered to said output port when said diodes are not conducting.

2. The antenna switch of claim 1 wherein said means for biasing comprises:
    a resistive network connected to said first and second diodes,
    a radio frequency choke connected from one end of said third diode to one end of said fourth diode whereby current from said second, third diodes and fourth diodes provide a path for a common current; and
    means for applying a DC voltage between said common terminal and said resistive network whereby a biasing current flows through said diodes.

3. The antenna switch of claim 1 further comprising DC blocking capacitor between said output port and second and third serially connected diodes.

4. An antenna switch for connecting first and second sources of a television signal to a television receiver comprising:
    a common terminal;
    a first terminal for receiving a first signal;
    a transformer having first and second windings, said first winding including a center tap; one end of each winding being connected through separate capacitors to said common terminal, the remaining ends of said windings connected through first and second diodes to said common terminal;
    a second terminal for receiving a second signal connected to the remaining end of said second winding, and
    a third diode connected between said center tap and first terminal in a direction to supply a DC current through said first winding to said common terminal;
    an output terminal connected to said center tap for delivering a signal to a television receiver antenna input terminal; and
    means for applying a biasing voltage between said first terminal and common terminal, and said second terminal and common terminal whereby said second signal is coupled to said output terminal.

5. The antenna switch of claim 4 wherein said means for biasing includes a radio frequency filter connected between said first terminal and said second terminal whereby a DC current is supplied from said first terminal to said second terminal in response to a DC voltage applied between said first terminal and said common terminal.

6. An antenna switch for supplying first and second signals to a receiver comprising:
    a first terminal for receiving said first signal;
    a transformer having first and second windings, said first winding connected to receive a signal from said first terminal and coupling said first signal to said second winding;
    an output terminal connected to one side of said second winding for delivering a signal to a receiver antenna input terminal;
    first shunt means connected in parallel with said first winding comprising a diode, said diode providing a bypass path for said first winding in response to a biasing current;
    a second shunt means connected across said second winding, said second shunt means comprising a second diode, which when carrying a biasing current couples a signal applied to the remaining end of said second winding to said output terminal;
    means for coupling said second signal to said second winding remaining end comprising a third diode in response to a biasing current, said coupling means including means, in the absence of said biasing current, for establishing a potential on said second remaining end of said winding to permit said first signal to be coupled to said output terminal; and means for simultaneously biasing said diodes into a conducting state whereby said second signal is coupled to said output terminal.

7. The antenna switch of claim 6 wherein said first and second shunt means comprises a capacitor serially connected with a respective diode.

8. An antenna switch for alternately connecting first and second signal sources to a receiver comprising:
a common terminal;
a transformer having first and second windings; said first winding having one end connected to said common terminal; means for applying said first signal source between said common terminal and the remaining end of said first winding;
a first shunt means including a first diode connected to bypass said first signal across said first winding in response to a biasing current;
a second shunt means including a second diode for providing a signal path from one end of said second winding to the remaining end of said second winding in response to a biasing current carried by said diode;
an output terminal connected to said second winding remaining end for delivering a signal to a receiver antenna input terminal;
means for connecting said second signal source between said second winding one end and said common terminal including a third diode in response to a current through said diode, said means providing a connection between said second winding one end and said common terminal in the absence of a biasing current through said third diode; and
means for biasing said diodes to carry a biasing current whereby said second signal source is connected between said output terminal and said common terminal, and in the absence of said biasing current said first source is connected between said output terminal and common terminal.

9. The antenna switch of claim 8 wherein said means for connecting said second signal source to said second winding one end comprises:
a capacitor connected from said one end to said common terminal;
an inductance connected to one end to said one end;
a fourth diode connecting said inductance remaining end to said common terminal whereby a biasing current through said fourth diode provides a resonant circuit comprised of said capacitor and inductance, and in the absence of said biasing current said capacitor provides a connection from said one end to said common terminal;
and means for supplying a bias current from said third diode to said fourth diode.

* * * * *